(12) United States Patent
Vad-Miller et al.

(10) Patent No.: US 12,184,453 B2
(45) Date of Patent: Dec. 31, 2024

(54) TUNING DIGITAL PRE-DISTORTION FOR A TRANSMITTER TO CORRECT NON-LINEAR ERRORS IN A RECEIVER

(71) Applicant: Mellanox Technologies, Ltd., Yokneam (IL)

(72) Inventors: Bjarke Vad-Miller, Roskilde (DK); Johan Jacob Mohr, Copenhagen NV (DK)

(73) Assignee: Mellanox Technologies, Ltd., Yokneam (IL)

( * ) Notice: Subject to any disclaimer, the term of this patent is extended or adjusted under 35 U.S.C. 154(b) by 72 days.

(21) Appl. No.: 18/142,146

(22) Filed: May 2, 2023

(65) Prior Publication Data
US 2024/0372753 A1 Nov. 7, 2024

(51) Int. Cl.
*H04L 5/12* (2006.01)
*H04L 25/02* (2006.01)
*H04L 25/03* (2006.01)
*H04L 25/06* (2006.01)

(52) U.S. Cl.
CPC .... *H04L 25/0234* (2013.01); *H04L 25/03859* (2013.01); *H04L 25/062* (2013.01)

(58) Field of Classification Search
CPC .......... H04L 25/0234; H04L 25/03859; H04L 25/062
USPC ............... 375/262, 260, 259, 219, 295, 316
See application file for complete search history.

(56) References Cited

U.S. PATENT DOCUMENTS

2020/0396021 A1* 12/2020 Schnizler .............. H04L 1/0045

* cited by examiner

*Primary Examiner* — Zewdu A Kassa
(74) *Attorney, Agent, or Firm* — Lowenstein Sandler LLP

(57) ABSTRACT

A receiver device includes circuitry to measure an error vector of a pulse amplitude modulation (PAM) sequence in a signal received from a transmitter and control logic coupled to the circuitry. The control logic removes estimated linear components from the measured error vector to generate a non-linear error vector. The control logic further determines, with reference to a set of lookup table (LUT) values, one or more tuning parameters for the PAM sequence based on the non-linear error vector and modifies the set of LUT values according to the one or more tuning parameters. The control logic further provides the modified set of LUT values to the transmitter, which when used by the transmitter to add digital pre-distortion to the PAM sequence, causes the non-linear error to be at least partially removed from the signal.

20 Claims, 12 Drawing Sheets

TUNING DIGITAL PRE-DISTORTION FOR A TRANSMITTER TO CORRECT NON-LINEAR ERRORS IN A RECEIVER

TECHNICAL FIELD

The present disclosure generally relates to processing of high-speed data transmissions, and more specifically, to tuning digital pre-distortion for a transmitter to correct non-linear error in a receiver.

BACKGROUND

High-speed data transmission (e.g., as may be performed in network or inter-device communication systems) may be carried out over various communication channels (e.g., electrical and/or optical channels). Such communication channels may carry modulated waveforms that represent bits of data, for example by pulse amplitude modulation (PAM). Passing through the channel, the signal integrity might be compromised by noise, jitter, linear distortion known as inter symbol interference (ISI) and non-linear distortion. The non-linear distortion is often particularly pronounced in the components which convert these signals between electrical and optical signals in fiber communication but can also arise in the signal driver stages in pure electrical links.

Both linear and non-linear distortion can be cancelled by use of digital pre-distortion (DPD) implemented by, for example, a lookup table (LUT). In the case of linear ISI, many techniques exist for estimating the ISI and populating the LUT entries to provide the appropriate pre-distortion. Techniques for estimating and consequently compensating for the non-linear distortion are less developed and typically require complicated offline digital signal processing, making these methods costly and not practically applicable to modern, real-time, high-speed communication links.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

As mentioned, non-linear pre-distortion techniques for estimating and consequently compensating for non-linear distortion in high-speed link devices are less developed and typically require complicated offline digital signal processing, making these methods costly and not practically applicable to modern, real-time, high-speed communication links. For example, it would be processing intensive, power inefficient, and cumbersome to use trial and error (e.g., brute force calculations) to determine LUT values that compensate for, within a receiver, non-linear distortion in a transmitter and/or communication channel from which a data signal originates.

Aspects and embodiments of the present disclosure address the above-mentioned deficiencies with current non-linear pre-distortion by isolating, as much as possible, a non-linear error vector that characterizes the non-linear distortion of a received signal within a receiver. In some embodiments, control logic of the receiver (e.g., a LUT update calculator) is configured to determine tuning parameters via algorithmic analysis of the non-linear error vector measured within the receiver for a PAM sequence being optimized. In some embodiments, a set of LUT values can then be modified according to (e.g., via use of) these tuning parameters that provide the negative (or opposite) of the non-linear error that has been detected. Once this set of modified LUT values are provided to the transmitter, in various embodiments, the transmitter (or transmission device) employs an updated set of LUT values in modulating a transmission signal (e.g., using the modified LUT values to determine PAM-based tap values) such that, when demodulated by the receiver, causes the non-linear error to be at least partially removed from the signal.

Advantages of the present disclosure include but are not limited to making real-time updates and iterative optimization to LUT values employed by a transmitter that significantly improves (e.g., reduces) non-linear distortion experienced in a receiver that receives the transmitted signal. The disclosed estimation approach is significantly less costly and less power consuming than doing an exhaustive search in the receiver to detect and remove the non-linear error. Thus, the disclosed LUT-based tuning of a transmitter (or transmission device) is practical in modern high-speed communication links (even in real time), effective, and efficient from cost, processing, and power perspectives. Other advantages will be apparent to those skilled in the art of high-speed data link devices discussed hereinafter.

Figure 1:
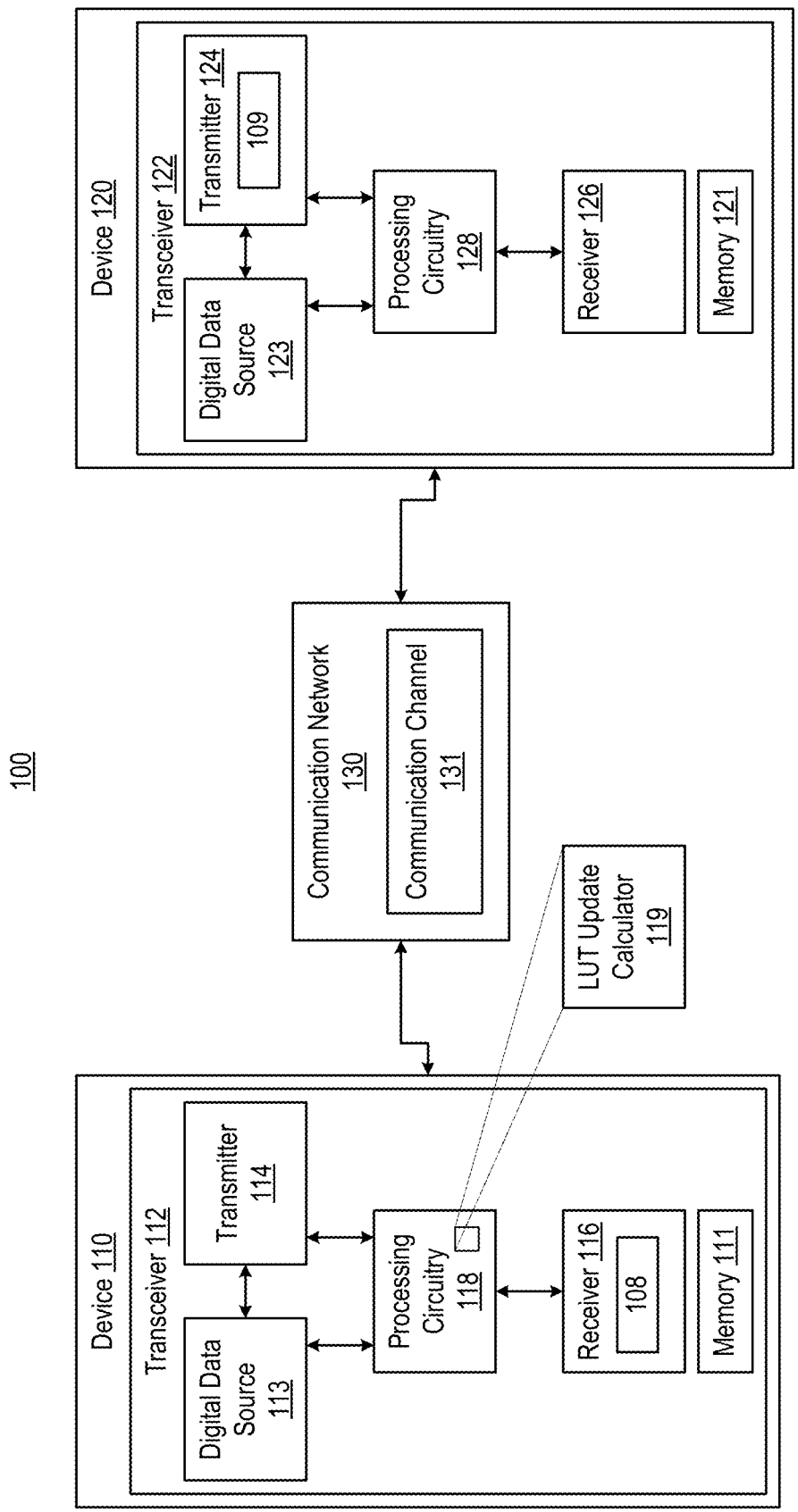
FIG. 1 illustrates an example network communication system in which tuning digital pre-distortion for a transmitter may be performed to correct non-linear error in a receiver, in accordance with at least some embodiments.

FIG. 1 illustrates an example communication system 100, in accordance with at least some embodiments. In various embodiments, the communication system 100 includes a device 110 and a device 120 that may be connected to, and communicate over, a communication network 130. The devices 110 and 120 may correspond to any appropriate type of device capable of communication with other devices connected to a common communication network 130. In some embodiments, for example, device 110 and device 120 may correspond to one or more of a Personal Computer (PC), a laptop, a tablet, a smartphone, a server, a collection of servers, or the like. As another example, in some embodiments, the device 110 and the device 120 each correspond to servers offering information resources, services and/or applications to user devices, client devices, or other hosts or clients in communication system 100.

In disclosed embodiments, the communication network 130 enables data transmission between devices 110 and 120. In some embodiments, for example, communication network 130 may be an Internet Protocol (IP) data network, an Ethernet network, an InfiniBand (IB) network, a Fibre Channel network, the Internet, a cellular communication network, a wireless communication network, or a combination thereof (e.g., Fibre Channel over Ethernet), variants thereof, and/or the like. In some embodiments, the communication network 130 enables data transmission between the devices 110 and 120 across the communication channel 131 (e.g., comprising one or more electrical channels, optical channels, and/or other communication channels). In some cases, data may be communicated as a modulated waveform (e.g., where the data being encoded is encoded into symbols for transmission). In some embodiments, for example, an amplitude modulation technique (e.g., pulse amplitude modulation (PAM)) may be used to encode data in a transmission waveform.

In various embodiments, the device 110 includes a transceiver 112 for transmitting and receiving signals, including for example, data signals, over the communication network 130. The data signals may include analog, digital, optical, and/or wireless signals, which may be modulated with data, and/or any other suitable signals for carrying data. In embodiments, the transceiver 112 includes a digital data source 113, a transmitter 114, a receiver 116, and processing circuitry 118 that may control the transceiver 112. The digital data source 113 may include suitable hardware and/or software for outputting data in a digital format (e.g., in binary code and/or thermometer code). The digital data output by the digital data source 113 may be retrieved from a memory 111 or generated according to an input (e.g., user input). In embodiments, the device 120 may include a transceiver 122 for sending and receiving signals, including for example, data signals, over communication network 130.

In some embodiments, the transmitter 114 includes suitable software and/or hardware for receiving digital data from a digital data source 113 and outputting a waveform according to the digital data that may be transmitted over the communication channel 131 of communication network 130, for example, to the device 120. In some embodiments, the receiver 116 includes suitable software and/or hardware for receiving waveforms from the communication channel 131 of the communication network 130, for example, from the device 120. In some embodiments, for example, the receiver 116 may include components for receiving and processing waveforms to extract data signals contained therein. The extracted data signals may be stored in the memory 111 (e.g., of the receiver 116 and/or the device 110).

In some embodiments, the receiver 116 includes a component to capture a waveform from communication channel 131 (e.g., a photodetector for detecting and capturing an optical waveform from an optical communication channel). The captured waveform, which may be modulated with data (e.g., according to an amplitude modulation scheme), may be passed to an analog-to-digital converter (ADC) that may be used to sample the incoming waveform and generate a digital signal therefrom. The digital signal may be equalized, for example, to remove inter symbol interference (ISI). The equalized signal may be passed along to initial demodulation circuitry (e.g., which may be part of a clock recovery block or circuit) that may generate an estimated transmitted symbol stream (e.g., comprising a series of preliminary symbol determinations). The equalized signal may also continue along a main data path where it may undergo further processing (e.g., further equalization) before passing through final demodulation circuitry that may output a symbol stream (e.g., comprising a series of final symbol determinations. Ultimately, the symbols may be decoded to obtain the transmitted data.

In various embodiments, the device 120 includes a transceiver 122 for transmitting and receiving signals, including for example, data signals, over the communication network 130. The data signals may include analog, digital, optical, and/or wireless signals, which may be modulated with data, and/or any other suitable signals for carrying data. In embodiments, the transceiver 122 includes a digital data source 123, a transmitter 124, a receiver 126, and processing circuitry 128 that may control the transceiver 122. The digital data source 123 may include suitable hardware and/or software for outputting data in a digital format (e.g., in binary code and/or thermometer code). The digital data output by the digital data source 123 may be retrieved from memory (not illustrated) or generated according to an input (e.g., user input).

In some embodiments, the transmitter 124 includes suitable software and/or hardware for receiving digital data from a digital data source 123 and outputting a waveform according to the digital data that may be transmitted over the communication channel 131 of communication network 130, for example, to the device 110. In embodiments, the receiver 126 includes suitable software and/or hardware for receiving waveforms from the communication channel 131 of the communication network 130, for example, from the device 120. In some embodiments, for example, the receiver 126 may include components for receiving and processing waveforms to extract data signals contained therein. The extracted data signals may be stored in a memory 121 (e.g., of the receiver 126 and/or the device 120).

In some embodiments, assume the device 110 operates as a receiving device and the device 120 operates as a transmitting device. As signals pass through the transmitter 124, through the communication channel 131, and are received and processed by the receiver 116, the signal integrity can be compromised by noise, jitter, linear distortion known as inter symbol interference (ISI) and non-linear distortion. The non-linear distortion is often particularly pronounced in the components which convert these signals between electrical and optical signals in fiber communication but can also arise in the signal driver stages in pure electrical links.

In some embodiments, the receiver 116 includes circuitry 108 to measure an error vector of a pulse amplitude modulation (PAM) sequence in a signal received from the transmitter 124 of the device 120. In at least these embodiments, the circuitry 108 and/or the processing circuitry 118 also includes components to remove linear components from the measured error vector to generate a non-linear error vector. In embodiments, the processing circuitry 118 includes control logic such as a lookup table (LUT) update calculator 119 configured to determine, with reference to a set of LUT values, one or more tuning parameters for the PAM sequence based on the non-linear error vector. In embodiments, the LUT update calculator 119 is further configured to modify the set of LUT values according to the one or more tuning parameters and provide the modified set of LUT values to the transmitter 124, which when used by the transmitter 124 to add digital pre-distortion to the PAM sequence, causes the non-linear error to be at least partially removed from the signal that is received by the receiver 116. In some embodiments, for example, the transmitter 124 includes a LUT 109 having LUT values, e.g., where the LUT 109 is implemented within a data structure such as a table, structured dataset, or the like, and can be stored in memory. As will be discussed in more detail with reference to FIG. 6, the LUT update calculator 119 may be employed outside of either of the receiving device 110 or the transmission device 120, e.g., as part of a distributed control system intended to facilitate non-linear compensated high-speed link communication between linked devices.

In various embodiments, the processing circuitry 118 includes software, hardware, or a combination thereof, for controlling the operation of the transceiver 112. In some embodiments, the processing circuitry 118 sends and/or receives signals to and/or from other elements of transceiver 112 (e.g., digital data source 113, transmitter 114, and/or receiver 116) to control the overall operation of transceiver 112. In some embodiments, processing circuitry 118 includes a memory including executable instructions and a processor (e.g., a microprocessor) that executes the instructions on the memory. The memory may correspond to any suitable type of memory device or collection of memory devices configured to store instructions, including for example, flash memory, random access memory (RAM), read only memory (ROM), variants thereof, combinations thereof, or the like. In some embodiments, the memory and the processor may be integrated into a common device (e.g., a microprocessor may include integrated memory). In some embodiments, the processing circuitry 118 is or includes an application-specific integrated circuit (ASIC) or other hardware.

In some embodiments, the processing circuitry 118 is or includes an Integrated Circuit (IC) chip, a CPU, a GPU, a DPU, a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It will be appreciated that any appropriate type of electrical component or collection of electrical components may be suitable for inclusion in the processing circuitry 118. In some embodiments, the transceiver 112 (or selected elements thereof) take the form of a pluggable card or controller for the device 110. In some embodiments, for example, the transceiver 112 (or selected elements thereof) is implemented on a network interface card (NIC). Furthermore, although not illustrates, it should be appreciated that the devices 110 and 120 and the transceivers 112 and 122 may include other processing devices, storage devices, and/or communication interfaces generally associated with computing tasks, such as sending and receiving data.

Figure 2:
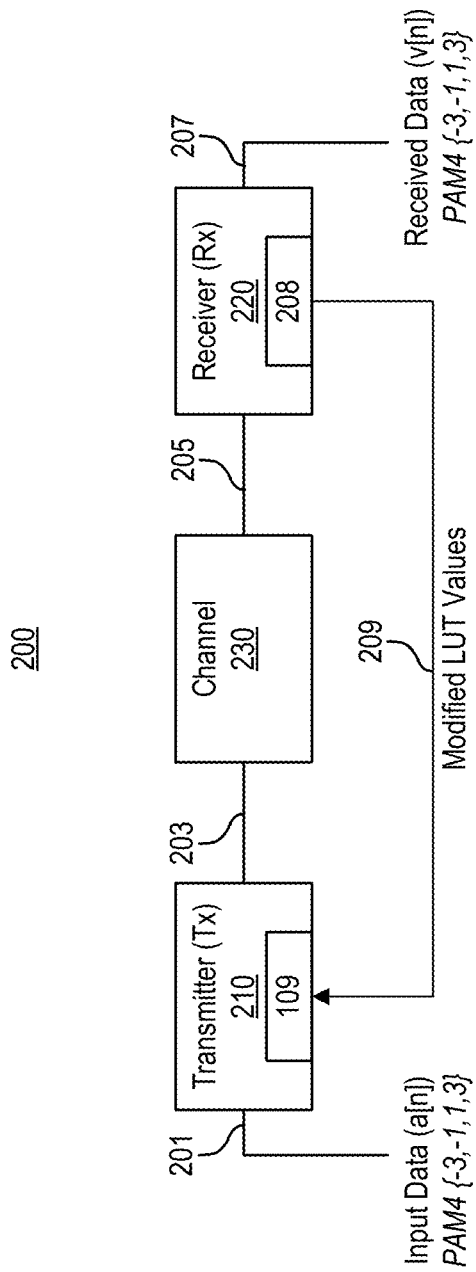
FIG. 2 is a block diagram of a communication system in which the tuning digital pre-distortion may be performed for a transmitter to correct for non-linear error in a receiver, in accordance with at least some embodiments.

FIG. 2 illustrates a block diagram of an example communication system 200, in accordance with at least some embodiments. In some embodiments, the communication system 200 includes a transmitter 210, a receiver 220, and a communication channel 230. The transmitter 210 may generate a signal conveying information, which after being transmitted over the communication channel 230, may be received and recovered by receiver 220. Information in the form of symbols may be embedded in the signal by transmitter 210, which may be recovered by receiver 220 (along with a symbol frequency, phase, and/or timing).

In embodiments, for example, the transmitter 210 receives, at operation 201, input data and transmit, at operation 203, the input data onto the communication channel 230. In some cases, a modulation scheme may be employed to vary the properties of a signal being transmitted and encode information thereby. In some embodiments, for example, an amplitude modulation technique may be used to encode information via an amplitude of a signal that is transmitted. For example, each of a specified number of amplitude levels may correspond to a particular symbol in a set of data symbols, where each symbol may represent a unique sequence of coded binary data. For example, as illustrated in FIG. 2, the transmitter 210 may receive, at operation 201, input data as a signal modulated according to a PAM4 modulation scheme.

In a PAM 4 modulation scheme, a signal may take on one of four unique amplitude levels (e.g., $\{-3, -1, 1, 3\}$) that correspond to different transmitted symbols (e.g., $\{0, 1, 2, 3\}$), with each symbol in the symbol alphabet representing a combination of binary bits of data (e.g., $\{00, 01, 10, 11\}$). It will be appreciated that the use of a PAM4 modulation scheme (or other PAM modulation schemes) in the description provided herein is by way of example and that other data modulation schemes can be used in accordance with embodiments of the present disclosure, including for example, a non-return-to-zero (NRZ) modulation scheme, PAM4, PAM8, PAM16, and the like. For example, where an NRZ modulation scheme is used, the transmitted data signal may consist of two symbols (e.g., −1 and 1), with each symbol value representing a binary bit (e.g., 0 and 1).

In disclosed embodiments, the communication channel 230 enables data transmission between the transmitter 210 and the receiver 220. In some embodiments, for example, the communication channel 230 is an electrical communication channel, an optical communication, or other communication channels. In some embodiments, the communication channel 230 is over a serial link (e.g., a cable, printed circuit boards (PCBs) traces, copper cables, optical fibers, or the like), high-speed serial links, read channels for data storage (e.g., hard disk, flash solid-state drives (SSDs), deep space satellite communication channels, or the like.

In various embodiments, the receiver 220 receives, at operation 205, an incoming signal from the communication channel 230 and outputs, at operation 207, received data. In some embodiments, the communication channel 230, and sometimes in combination with components of the receiver 220, impart non-linear distortion to the received signal. This non-linear distortion is often particularly pronounced in components that convert these signals (e.g., PAM-based signal) between electrical and optical signals in fiber communication but can also arise in the signal driver stages in pure electrical links.

In at least some embodiments, the receiver 220 includes circuitry 208 configured to measure an error vector of a PAM sequence in the signal received from the transmitter 210 to generate a non-linear error vector, e.g., that models the non-linear distortion. In embodiments, the circuitry 208 (and/or other control logic of the receiver 220) determines tuning parameter(s) associated with this measured non-linear error vector that the circuitry 208 can then use to modify a set of LUT values employed by the transmitter 210, e.g., by way of digital pre-distortion to at least partially remove non-linear error from the received signal. Thus, in embodiments, the receiver 220 provides, at operation 209, these modified LUT values to the transmitter 210 for use in updating the LUT 109 maintained by the transmitter 210 for such digital predistortion.

Figure 3:
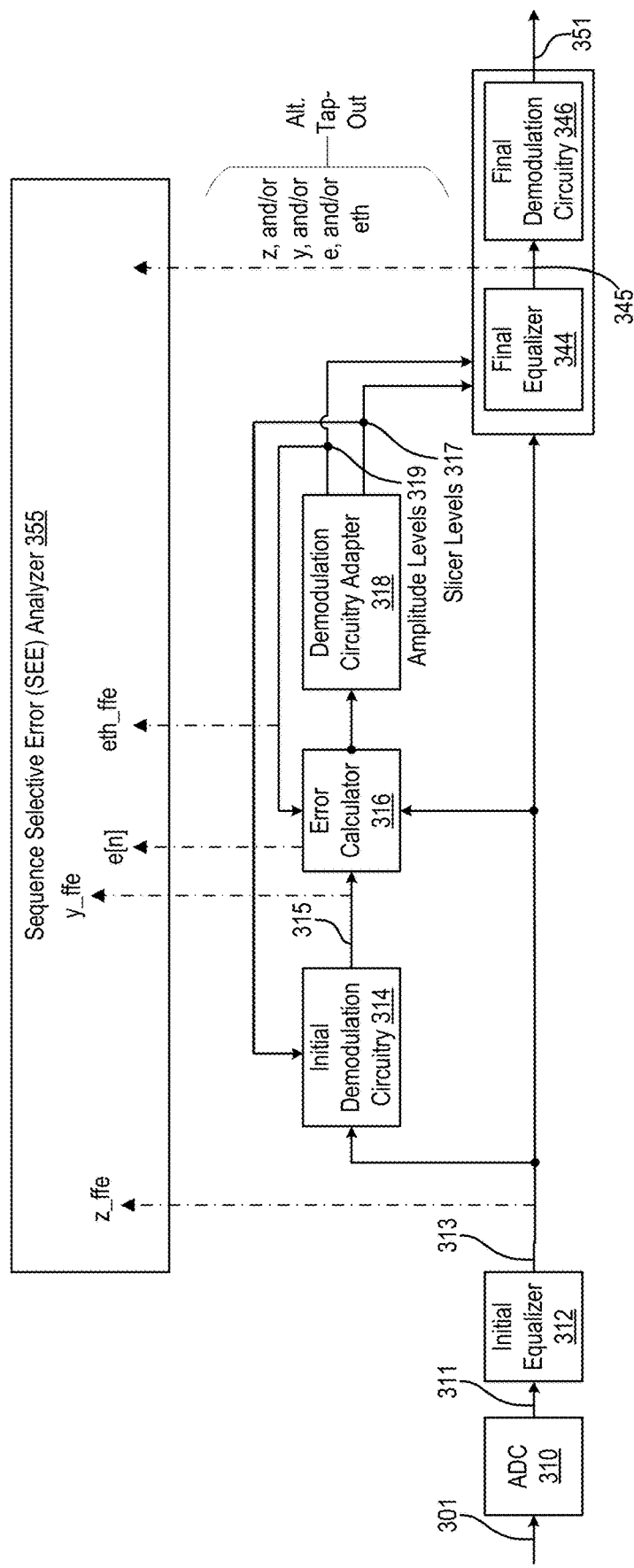
FIG. 3 is a block diagram of a first example of a receiver device configured to receive and demodulate a received link signal, in accordance with at least some embodiments.

FIG. 3 is a block diagram of a first example of a receiver device 300 configured to receive and demodulate a received link signal, in accordance with at least some embodiments. As illustrated in FIG. 3, the receiver device 300 includes an analog-to-digital converter, or ADC 310, an initial equalizer 312, initial demodulation circuitry 314, an error calculator 316, a demodulation circuitry adapter 318, a final equalizer 344, and final demodulation circuitry 346. In some embodiments, the ADC 310 receives an incoming waveform 301, for example, from a communication channel (e.g., from an electronic and/or optical channel) and may operate to sample the incoming waveform 301 and generate a digital signal 311 (which may be represented as z[n]). The incoming waveform 301, for example, may be an analog waveform (e.g., a voltage waveform captured by a photodetector coupled to an optical channel) that the ADC 310 may sample (e.g., measure an amplitude of incoming waveform 301) at periodic intervals and assign a digital value to each sample to generate digital signal 311. The ADC 310 may provide the digital signal 311 to initial equalizer 312.

In disclosed embodiments, the initial equalizer 312 receives the digital signal 311 and operates to equalize the digital signal 311 (e.g., to improve a signal-to-noise ratio (SNR)) and generate an equalized signal 313 therefrom (which may be represented as z_ffe[n]). In some embodiments, the initial equalizer 312 also operates to scale the digital values such that the digital values fall within a desired range (e.g., between −1024 and 1023, which may be represented as an 11-bit signed integer). In some embodiments, the initial equalizer 312 includes a linear feed-forward equalizer (FFE), which may take the form of a finite impulse response (FIR) filter. In some embodiments, the initial equalizer 312 additionally, or alternatively, includes a continuous-time linear equalizer (CTLE). It will be appreciated that other equalizers may be included in addition to, or in place of, those mentioned depending on the embodiment and its application.

In various embodiments, the equalized signal 313 is provided to the initial demodulation circuitry 314 as well as to an error calculator 316 of the receiver device 300. In embodiments, the initial demodulation circuitry 314 receives the equalized signal 313 and operates to demodulate the equalized signal 313 and generate an estimated transmitted symbol stream, or demodulated signal 315, therefrom (which may be represented as y_ffe[n] or more generally, ŷ[n]). In embodiments, the demodulated signal 315 contains a series of preliminary symbol determinations corresponding to the equalized signal 313. In embodiments, for each value in equalized signal 313, the initial demodulation circuitry 314 makes a preliminary determination as to a corresponding symbol encoded thereby. In some embodiments, for example, the equalized signal 313 carries information encoded using an amplitude modulation scheme (e.g., as a PAM modulation scheme). Based on a value of the equalized signal 313, the initial demodulation circuitry 314 determines a corresponding symbol in the amplitude modulation scheme (e.g., in a corresponding PAM alphabet).

In some embodiments, for example, the initial demodulation circuitry 314 takes the form of a slicer that compares the value of the equalized signal 313 to a set of threshold values (or slicer levels)—which mark the boundary between amplitude ranges for each symbol in the symbol alphabet—to make a symbol determination. For example, in some embodiments, the equalized signal 313 carries information encoded according to a PAM4 modulation scheme, which maps amplitude levels (that may be represented as vector eth, e.g., eth={eth(−3), eth(−1), eth(+1), eth(+3)}) to a four-symbol alphabet (which may be represented as vector α, e.g., a balanced alphabet: α={−3, −1, 1, 3} or an unbalanced alphabet: α={0, 1, 2, 3}). In such cases, the slicer may apply three slicer levels (which can be represented as vector yth, e.g., yth={yth(−2), yth(0), yth(2)}) to make a preliminary symbol determination. In some embodiments, the slicer levels 317 are provided as an input to the initial demodulation circuitry 314 (e.g., by the demodulation circuitry adapter 318, which may adapt the slicer levels 317 as described below). The demodulated signal 315 containing the preliminary symbol determinations may be provided to the error calculator 316 and the demodulation circuitry adapter 318, for example.

In various embodiments, the error calculator 316 receives the equalized signal 313, the demodulated signal 315, and a set of amplitude levels 319 (e.g., from the demodulation circuitry adapter 318, which may adapt the amplitude levels 319 as described below) and operates to determine an error between the equalized signal 313 and a corresponding amplitude level and generate an error signal therefrom (which may be represented as e[n]). In some embodiments, for example, the error calculator 316 compares a value of the equalized signal 313 (z_ffe[n]) to a level in the set of amplitude levels 319 corresponding to the preliminary symbol determination of demodulated signal 315 (eth[ŷ[n]]) to determine an error (e.g., an amount of difference (z_ffe[n]−eth[ŷ[n]]) or a sign of the difference (sign((z_ffe[n]−eth[ŷ[n]]))). The error determined by error calculator 316 may be provided as an error signal to the demodulation circuitry adapter 318.

In some embodiments, the demodulation circuitry adapter 318 receives the error signal and the demodulated signal 315 from the error calculator 316 and operates to adapt slicer levels 317 (yth) and amplitude levels 319 (eth). In some embodiments, for example, the demodulation circuitry adapter 318 includes an integrator that accumulates an error for each amplitude level in the modulation scheme over a number of samples (e.g., across 128 samples). The output of the integrator may then be used to adapt the amplitude levels 319, e.g., adding the accumulated error or an average accumulated error for each amplitude level to current amplitude levels 319.

In some embodiments, for instance, the demodulation circuitry adapter 318 includes a gradient multiply-accumulator (or GMAC) accumulates the error signal received from the error calculator 316 based on the demodulated signal 315. By way of example, where a PAM4 modulation scheme is employed, and the error signal (e[n]) is a sign of the difference between equalized signal 313 and an amplitude level in the set of amplitude levels 319 corresponding to the preliminary symbol determination of the demodulated signal 315 (eth[ŷ[n]]). In some cases, the accumulated error may be scaled by a scaling factor ($Y_{scale}$), which may be adjusted to control a speed of adaption. The operation of the GMAC may be expressed as follows:

$$k \in \alpha = \{0, 1, 2, 3\} \quad \text{Eq. 1}$$

$$grad(k, n) = \begin{cases} e[n], & \hat{y}[n] = k \\ 0, & \text{otherwise} \end{cases} \quad \text{Eq. 2}$$

$$grad(k) = \sum_{n=1}^{N_{seg}} grad(k, n), \; N_{seg} = 128 \quad \text{Eq. 3}$$

$$eth[k] \mathrel{+}= Y_{scale} * grad(k) \quad \text{Eq. 4}$$

where N_seg is a deserialization factor.

In some embodiments, the GMAC adjusts the accumulated errors based on a probability of each amplitude level (which may be presented as p). For example, in a PAM4 modulation scheme, the following amplitude-level probabilities may be used:

$$\left\{\frac{1}{4}, \frac{1}{4}, \frac{1}{4}, \frac{1}{4}\right\},$$

in which case the eth adaptation may be expressed as follows:

$$eth[k] \mathrel{+}= \frac{Y_{scale} * grad(k)}{p(k)} \quad \text{Eq. 5}$$

In embodiments, the demodulation circuitry adapter 318 uses the adapted amplitude levels 319 to adapt slicer levels 317. In some embodiments, for example, the demodulation circuitry adapter 318 bisects adapted amplitude levels 319 to obtain adapted slicer levels 317 (e.g., the midpoint between adapted amplitude levels 319). The adapted slicer levels 317 and amplitude levels 319 may be fed back to the initial demodulation circuitry 314 and error calculator 316, respectively, and passed along to other components on the main data path (e.g., to the final equalizer 344, and/or the final demodulation circuitry 346). While such closed-loop adaptation of the slicer levels 317 used by the initial demodulation circuitry 314 may generally be able to compensate for drift in a received waveform, their adaptation may not be sufficient to compensate for non-linear distortion that also might be present in the equalized signal 313.

In various embodiments, the final equalizer 344 receives the equalized signal 313 and operates to equalize the equalized signal 313 and generate a further equalized signal 345 therefrom (which may be represented as z_final[n]). In some embodiments, the final equalizer 344 includes a reflection canceller. It will be appreciated that other equalizers may be included in addition to, or in place of, those mentioned depending on the embodiment and its application. In embodiments, final equalizer 344 provides the equalized signal 345 to final demodulation circuitry 346.

In at least some embodiments, the final demodulation circuitry 346 receives the further equalized signal 345 and operates to demodulate the further equalized signal 345 and generates a final demodulated signal 351 therefrom (which may be represented as y_better[n], or again generally ŷ[n]). The final demodulated signal 351, or x̂[n], may contain a series of final Tx symbol determinations corresponding to the equalized sample values in further equalized signal 345. In some embodiments, for a full-bandwidth PAM-N, x̂[n] =ŷ[n], but other coding schemes could also be used. In some embodiments, for example, the final demodulation circuitry 346 employs simple symbol-by-symbol detection, a full Viterby decoder, or an approximate Viterby decoder to determine a corresponding symbol for each value in the further equalized signal 345. The final demodulation circuitry 346 may output a final demodulated signal 351, for example, to a decoder that may decode the final symbol determination (e.g., to obtain the transmitted data encoded thereby).

In various embodiments, the receiver device 300 includes a sequence selective error (SEE) analyzer 355 that is configured to measure an error vector from a PAM (or other digitally-generated data) sequence in a signal received from a transmitter. In some embodiments, the SEE analyzer 355 is configured to tap values from particular locations within the receiver components of the receiver device 300, usable to determine the error vector as will be discussed in more detail hereinafter. For example, values for z_ffe may be tapped from the equalized signal 313, the values for y_ffe may be tapped from the demodulated signal 315, error values (e) may be obtained (and optionally accumulated) from the error calculator 316, and values for eth_ffe may be tapped from the set of amplitude levels 319 or from the further equalized signal 345. Different combinations of these tapped values may be employed for different approaches to generating the error vector, so not all of these values may necessarily be tapped or used by the SEE analyzer 355, which is described in more detail hereinafter.

It will be appreciated that in some embodiments receiver device 300 may be included or incorporated into a larger system or device, including for example, a serializer/deserializer (SerDes) device, a receiver, a transceiver, a network communication system, and/or other system or device in which high-speed data transmissions may be received. Furthermore, because digital pre-distortion is performed in the digital domain at an intermediate stage of data transmission processing, other components or processing blocks of those systems or devices may benefit, including for example, a clock-recovery and/or a symbol detector component.

Figure 4:
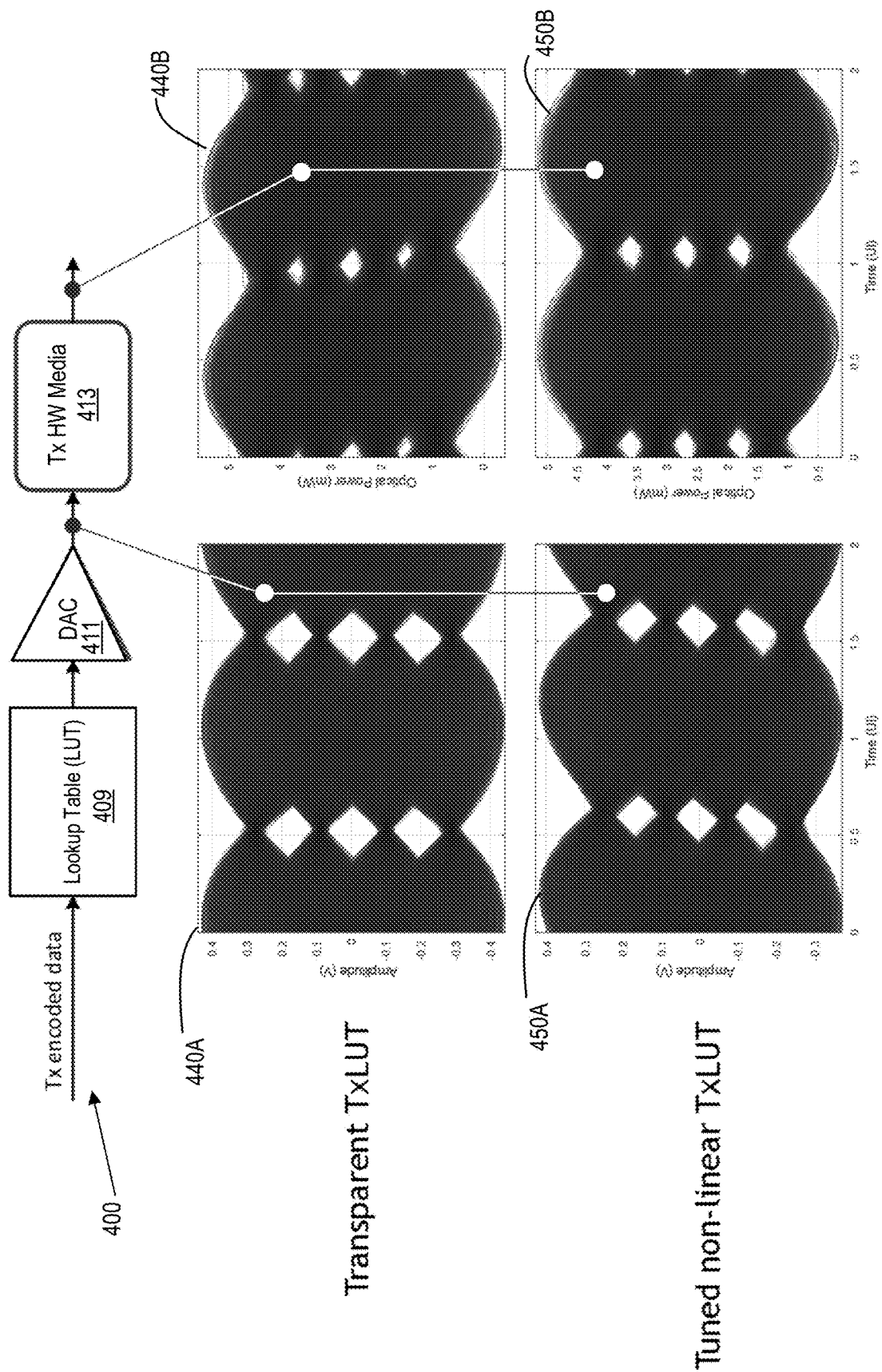
FIG. 4 is a block diagram of transmitter circuitry that employs a lookup to perform digital pre-distortion, in accordance with at least some embodiments.

FIG. 4 is a block diagram of transmitter circuitry 400 that employs a lookup table (LUT) to perform digital pre-distortion, in accordance with at least some embodiments. In some embodiments, the transmitter circuitry 400 is located within the transmitter 124 (FIG. 1) or the transmitter 210 (FIG. 2) and the LUT 409 is the LUT 109 of FIGS. 1-2. In various embodiments, the transmitter circuitry 400 generates transmitter (Tx)-encoded data, e.g., symbols, that are used as a lookup in the LUT 409 to select a tap value from the LUT 409. The output of the LUT 409 may be a string of symbols, for example, that drives a digital-to-analog converter (DAC) 411, which drives physical media, e.g., Tx hardware media 413 of the transmitter circuitry 400, illustrated in FIG. 4. This Tx hardware media 413, driven by the DAC 411, imparts both linear errors (e.g., D.C. offsets) as well as dynamic non-linearity that includes non-linear distortion or errors. This dynamic non-linearity often creates distortions that are significantly more difficult to compensate than linear errors.

More specifically, the non-linear channel distortion, after linear equalization in the receiver 116 or 220, manifests itself as a systematic, symbol pattern-dependent error that cannot be described through a linear combination of the transmitted symbols. The non-linear error in this context may be understood as the difference between the received signal level and the ideal symbol level determined through slicing the received signal and assigning it to a specific symbol. The ideal symbol level is denoted eth, short for "error threshold" and should be determined separately.

In an exemplary embodiment, eye diagram 440A illustrates amplitude (in volts) and eye diagram 440B illustrates optical power (in milliwatts) of a PAM4 signal received from a transmitter in which the LUT 409 is not tuned for non-linear distortion. In this exemplary embodiment, in contrast, eye diagram 440A illustrates amplitude and eye diagram 450B illustrates optical power of that same PAM4 signal received from the transmitter in which the LUT 409 was turned for non-linear distortion or error. As can be observed, the LUT values of the LUT 409 have many degrees of freedom and modifying the LUT values to add digital pre-distortion can be significantly less costly and less power consuming than doing an exhaustive search in the receiver to detect and remove the non-linear error.

With more specificity, according to various embodiments, the present disclosure discusses how these LUT values can be tuned (e.g., updated or modified) so that the output of the DAC 411 includes the opposite of the expected non-linearities. In embodiments, therefore, the tuned LUT values pre-compensate for the non-linearities so that when the expected non-linearities occur, they are cancelled out by the already tuned LUT values operating as tap values for the symbols generated by the Tx hardware media 413.

Figure 5:
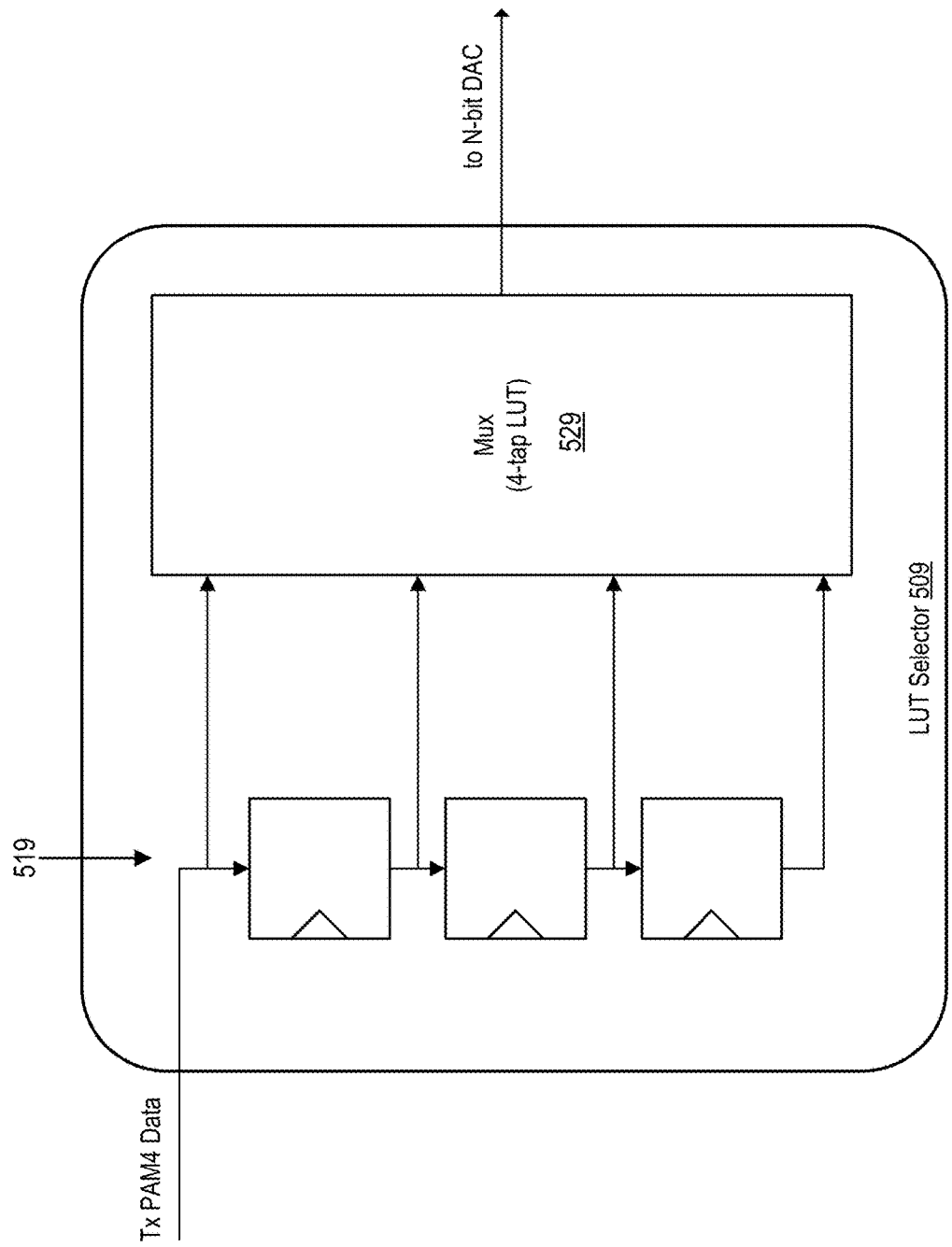
FIG. 5 is a block diagram of exemplary LUT value selector circuitry of a transmitter, in accordance with at least some embodiments.

FIG. 5 is a block diagram of exemplary LUT value selector circuitry 509 of a transmitter, in accordance with at least some embodiments. In some embodiments, the transmitter 124 or 210 includes the LUT value selector circuitry 509 in order to support selecting from a matrix or table of many LUT values. For example, in different embodiments, the LUT values may be 64 values ($=4^3$ for a 3-tap PAM4 system)), 256 values ($=4^4$ for a 4-tap PAM4 system), or another number of values for other modulation formats and/or Tx coding schemes employed by the Tx hardware media 413.

In at least some embodiments, the Tx PAM4 data are gated into a flip-flop chain 519, one symbol for each Tx clock. In these embodiments, the flip-flop chain 519 provides a set of consecutive symbols (e.g., here 4 symbols) that controls a multiplexer 529, which selects one N-bit DAC value that is sent to a DAC, e.g., the DAC 411. This DAC value may be designated as the LUT value for this particular transmit symbol sequence. The number of taps may vary depending on transmitter implementation.

In various embodiments, therefore, the present application discloses how to optimize a set of many LUT values for a mixture of affects, including loss, noise, compression, linear errors, and non-linear errors to generate as clean a received de-modulated signal as possible, e.g., at the receiver 116 or 220. It would be very processing intensive and cumbersome to use trial and error (e.g., brute force calculations) to determine these LUT values.

Figure 6:
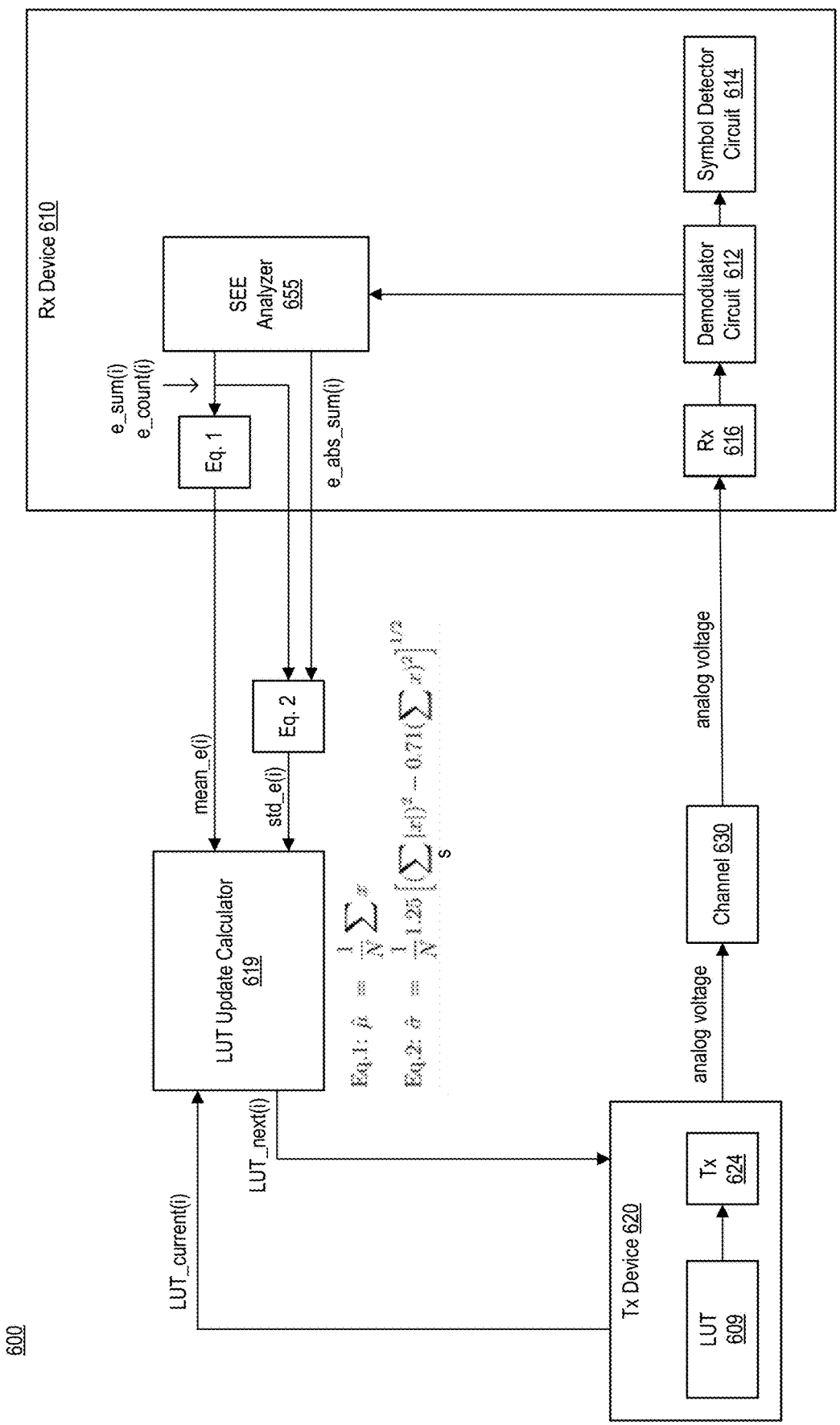
FIG. 6 is a block diagram of an example link system having a receiver that includes a sequence selective error (SEE) analyzer and a LUT update calculator to tune digital pre-distortion of a transmitter, in accordance with at least some embodiments.

FIG. 6 is a block diagram of an example link system 600 having a receiver that includes a sequence selective error (SEE) analyzer and a LUT update calculator to tune digital pre-distortion of a transmitter, in accordance with at least some embodiments. In disclosed embodiments, the system 600 includes a receiver (Rx) device 610, a transmitter (Tx) device 620, and a LUT update calculator 619, and a channel 630 through which to communicate between the Tx device 620 and the Rx device 610, similar to as have been disclosed previously. In embodiments, the LUT update calculator 619 is located within the Rx device 610, the Tx device 620, or somewhere in between (e.g., outside of) the Rx device 610 and the Tx device 620. In some embodiments, control logic performing the LUT tuning disclosed herein is instantiated as the LUT-update calculator 619 coupled between the receiver device 610 including the receiver circuitry (e.g., the receiver 616) and the transmitter device 610 that includes the transmitter 624.

In at least some embodiments, the Tx device 620 includes a LUT 609 (e.g., a data structure to store various LUT values) and a transmitter 624. In embodiments, the Rx device 610 includes a receiver 616, a demodulator circuit 612 coupled to the receiver 616, and a symbol detector circuit 614 coupled to the output of the demodulator circuit 612. In embodiments, the demodulator circuit 612 includes the components described with reference to the receiver device 300 (FIG. 3) except the SEE analyzer 355. In embodiments, however, the Rx device 610 also includes an SEE analyzer 655 coupled to the demodulator circuit 612 and the LUT update calculator 619. In some embodiments, the SEE analyzer 655 is the SEE analyzer 355 (FIG. 3).

In disclosed embodiments, at the Rx device 610, the SEE analyzer 655 captures and analyzes the error caused by non-linearity, e.g., by introducing a hardware circuit (see FIG. 8) that conducts repeated observations of the error e, gated by a selected sequence of decoded PAM symbols $\{x\_0, x\_1, \ldots, x\_\{N-1\}\}$, where decoding is based on the preliminary demodulated y_hat[n]. The repeated measurements for a given sequence enables distinguishing the sequence dependent error from other noise source effecting the error. The error due to the non-linearity, for a single sequence, may be estimated by calculating the mean error of all the observations.

In various embodiments, the SEE analyzer 655 is configured to analyze the processed signal at various stages of processing (e.g., as was discussed with reference to FIG. 3) of the demodulator circuit 612 to determine selective sequence of symbol errors. In embodiments, the SEE analyzer 655 is configured with different circuitry to accumulate errors in different ways, e.g., a summation of error values (e_sum(i)), a count of error values (e_count(i)), and an absolute summation of error values (e_abs_sum(i)). The former two values may be provided to control logic that calculates equation (1) to determine the mean of the error (mean_e(i)) and the latter e_abs_sum(i) value may be provided to control logic that calculates equation (2) to determine a the 1-norm, which might be used as a proxy for the standard deviation of the error (std_e(i)). The value N in equations (1) and (2) is the number of LUT values to be selected corresponding to a number of tap values of the Tx hardware media, e.g., of the transmitter 624. In some embodiments, the LUT update calculator 619 receives the mean of the error and the standard deviation of the error as the PAM signal is received, as well as a current set of LUT values (LUT_current(i)) from which the LUT update calculator 619 determines the next set of LUT values (LUT_next (i)). In embodiments, the LUT update calculator 619 sends this next set of LUT values to the Tx device 620 for use by the transmitter 624 to determine tap values.

With additional specificity, according to various embodiments, the demodulator circuit 612 provides, from the final demodulated signal, adapted levels (e.g., eth(k,1:4)), signal values (ffe_z(k,n), and estimated data values (x_hat(k,n)). In these embodiments, n signifies a register transfer level (RTL) block number, e.g., 1, 2, 3 . . . , and k is a value index, such as 1, 2, . . . , 64 (or 128). Further, in these embodiments, the value i is an x_hat-sequence, such as i=1, 2, . . . 256 (corresponding to 256 discrete LUT values) and j is an index of y_hat for the selected x_hat-sequence, e.g., j=1, 2, . . . , 4. In these embodiments, the e_sum(i) value is accumulated for each x_hat-sequence match, the e_count(i) value is accumulated for the number of such matches, and the e_abs_sum(i) is determined given x_hat-sequence matches as well.

Figure 7:
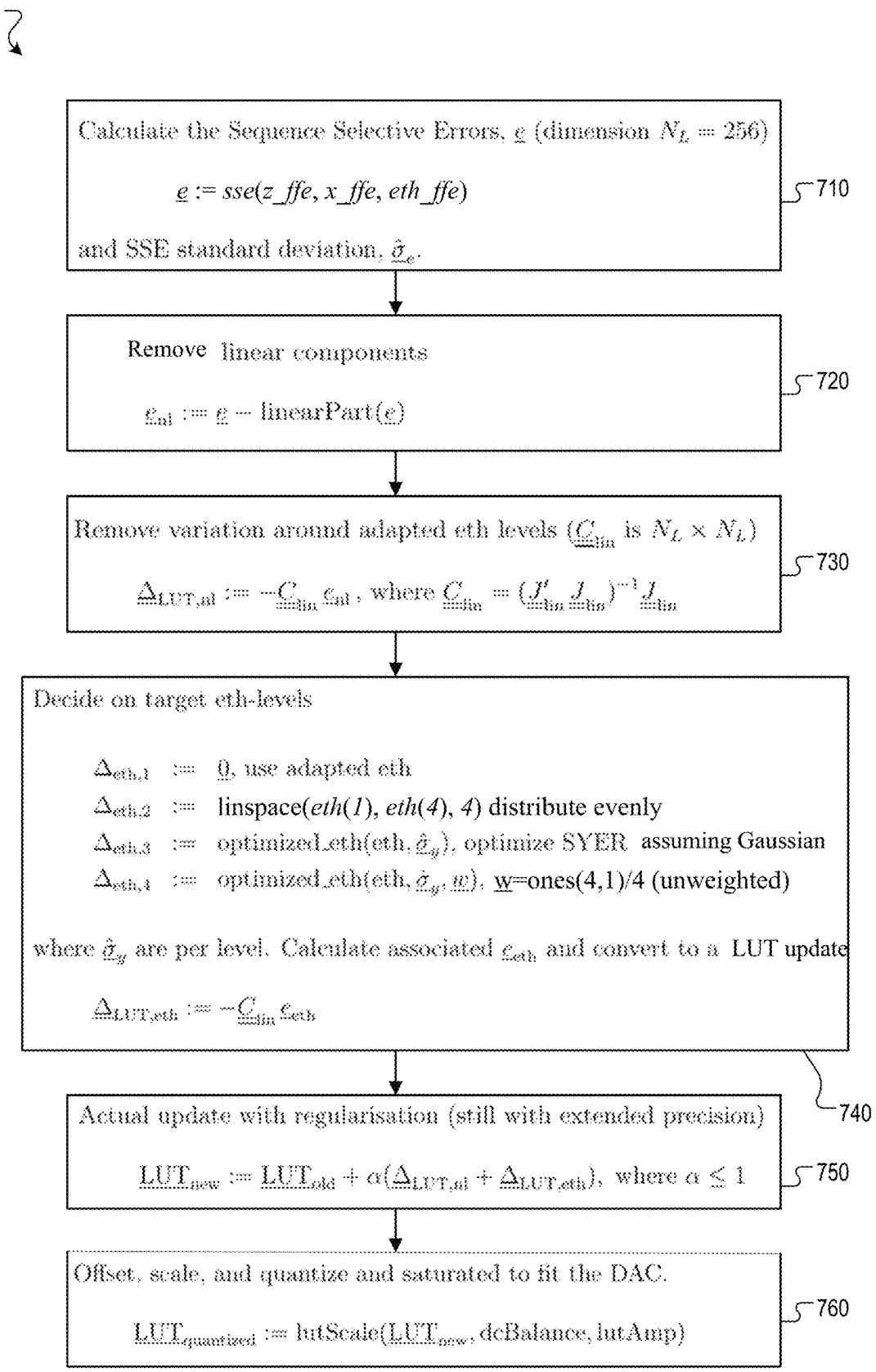
FIG. 7 is a flow diagram of a method 700 of making LUT value iterative changes to tune transmitter tap values, in accordance with at least some embodiments.

FIG. 7 is a flow diagram of a method 700 of making LUT value iterative changes to tune transmitter tap values, in accordance with at least some embodiments. The method 700 can be performed by processing logic comprising hardware, software, firmware, or any combination thereof. In various embodiments, the method 700 is performed by a receiver device 110, 220, 610 or a combination of the receiver device and the LUT update calculator 119 or 619.

At operation 710, the processing logic measures an error vector of a pulse amplitude modulation (PAM) sequence in a signal received from a transmitter. In some embodiments, the measuring includes calculating sequence selective errors within the PAM sequence of the signal, which was introduced with reference to the SEE analyzer 655 of FIG. 6, and as will be discussed in more detail with reference to FIGS. 8-9. These errors can include ISI-related and eth-related errors and can be determined at a medium or average level for each symbol.

At operation 720, the processing logic removes estimated linear components from the measured error vector to generate a non-linear error vector. In embodiments, some linear components remain as residual linear errors, where removal of the linear components is less than perfect. Accordingly, the non-linear error vector may be understood to be substantially non-linear sufficient to the level of being analyzed for non-linear LUT optimization. To perform operation 720 in some embodiment, the processing logic identifies, from the signal that is output from a feedforward equalizer (FFE) of the receiver circuitry, a residual linear inter-symbol interference (ISI) represented as a linear function of symbol sequences. The processing logic can then remove the residual ISI from the measured error vector.

With general reference to operations 730 through 760, the processing logic determines, with reference to a set of lookup table (LUT) values, one or more tuning parameters for the PAM sequence based on the non-linear error vector and modifies the set of LUT values according to the one or more tuning parameters, e.g., before providing the modified set of LUT values to the transmitter to use in data link transmission.

At operation 730, for example, the processing logic determines, with reference to a set of LUT values, variations to a plurality of adapted error threshold levels that approximate the non-linear error vector. In embodiments, each adapted error threshold level, which can be used in Rx symbol detection, is placed as close as possible to a mean of the recovered signal population belonging to a corresponding symbol. This is done to minimize the error and thus facilitate symbol direction, by traditional slicing or more advance methods like decision feedforward equalization (DFE) or a maximum likelihood sequence estimator (MLSE). Thus, in some embodiments, the processing logic estimates how the non-linear error is going to behave and adapts the LUT values accordingly, e.g., removes the variations from the set of LUT values.

In some embodiment, to perform operation 730, the processing logic characterizes, with a Jacobian matrix (J), measured error values of the non-linear error vector that correspond to respective values of the set of LUT values and multiplies a pseudo-inverse of the Jacobian matrix $(J'J)^{-1}$ with the non-linear error vector. This pseudo-inverse Jacobian matrix may then code, within the set of LUT values, the opposite of actual non-linearities so that the two can later cancel out. Because use of the Jacobian matrix works for small changes, the characterization operations employed with the Jacobian matrix are iterated on in some embodiments to optimize the pseudo-inverse values that are ultimately applied to the set of LUT values.

At operation 740, the processing logic determines, with reference to the set of LUT values, a plurality of target error threshold levels for the PAM sequence and tunes at least some of the set of LUT values according to the plurality of target error threshold levels. For example, in operation 740, the processing logic endeavors to manipulate the way that the error threshold (eth) levels are distributed. Outer eyes tend to get squeezed out, so the processing logic can modify the set of LUT values to provide the outer eyes more room knowing the channel width will take that space, which will be discussed in more detail with reference to FIG. 10.

Operation 740, as illustrated in FIG. 7, includes a number of different ways to estimate the target error threshold levels. In a first approach ($\Delta_{eth,1}$), the processing logic identifies a plurality of adapted error threshold levels, e.g., and makes no additional changes to the target eth levels. In a second approach ($\Delta_{eth,2}$), the processing logic evenly distributes the plurality of adapted error threshold levels of respective symbols of the PAM sequence. In a third approach ($\Delta_{eth,3}$), the processing logic optimizes the plurality of adapted error threshold levels such that tails of amplitude distributions of the respective symbols have a minimum overlap (see FIG. 10). In embodiments, the third approach includes weighting the different symbol level distributions by each of their respective probabilities, e.g., for a full-bandwidth PAM-4 receiver, the probability for the lowest level to the highest level can be expressed as 1/4, 1/4, 1/4, 1/4, respectively. In a fourth approach ($\Delta_{eth,4}$), the extra weighting of the third approach is omitted, thus changing the optimum distribution of the symbols levels when seeking to minimize tail overlaps. In some embodiments, subsequent iterations of the method 700 perform different ones of these different approaches, thus potentially providing a variety of target eth level estimation for better LUT value optimization.

At, operation 750, the processing logic performs the actual updates (e.g., tuning) of the set of LUT values with regularization, e.g., using the estimated eth levels from operation 740.

At operation 760, the processing logic offsets, scales, and quantizes the modified set of LUT values to fit a digital-to-analog converter (DAC) through which the set of LUT values is transferred within the transmitter. Operation 760, in embodiments, is performed by multiplying LUT updates with a regularization factor before the LUT updates are added to the original LUT values. After this, the new LUT values may be scaled and quantized to fit a range and resolution of the transmitter LUT.

Figure 8:
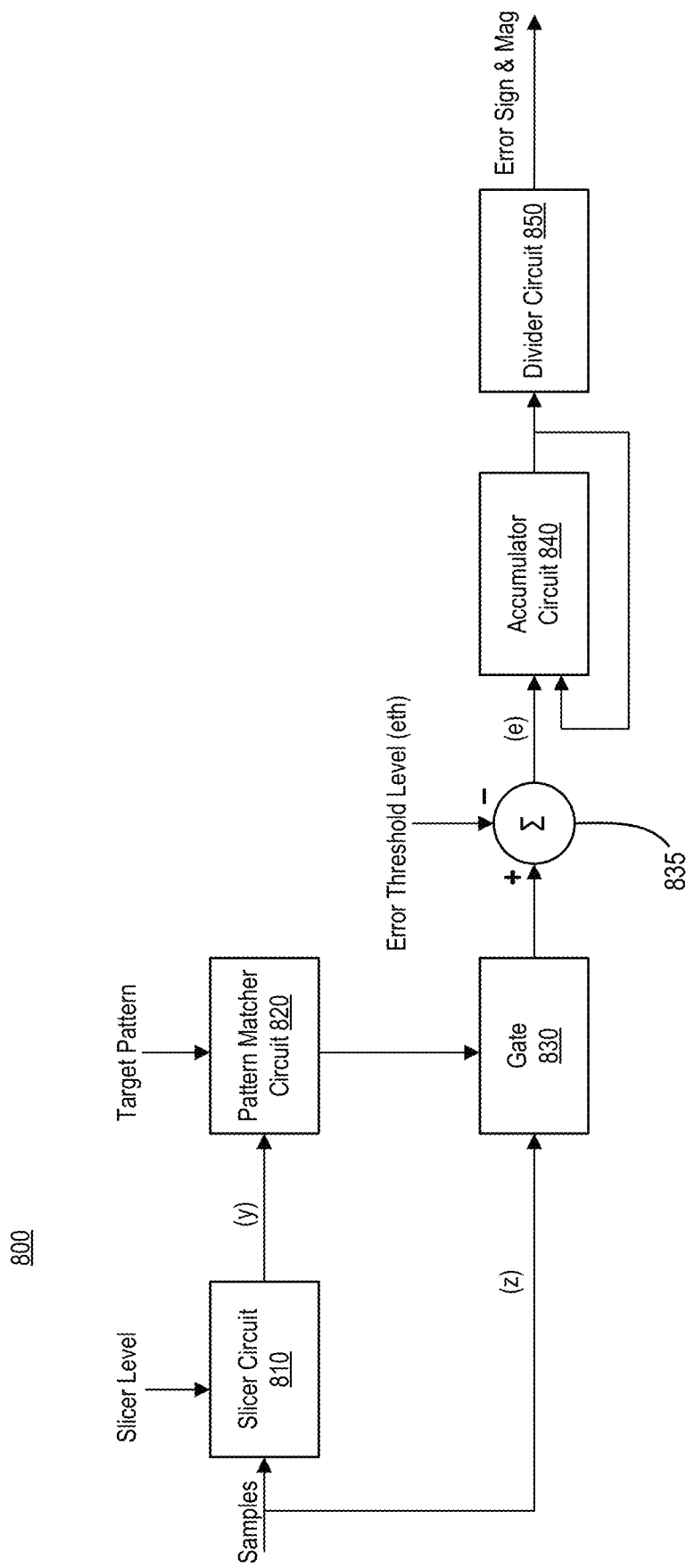
FIG. 8 is a block diagram of a circuit (or device) configured to measure or estimate an error sign and magnitude of various slices of a PAM signal, in accordance with at least some embodiments.

FIG. 8 is a block diagram of a circuit 800 (or device) configured to measure or estimate an error sign and magnitude of various slices of a PAM signal, in accordance with at least some embodiments. In various embodiments, the circuit 800 includes a slicer circuit 810, a pattern matcher circuit 820, a gate 830, a summer 835, an accumulator circuit 840, and a divider circuit 850. In at least some embodiments, the slicer circuit 810 slices through received modulated signals, e.g., PAM4 signals at a certain slicer level (see FIG. 9). The pattern matcher circuit 820, which is coupled between the slicer circuit 810 and the gate 830, may receive a target pattern and match the target pattern against where symbols are detected in the samples.

With continued reference to FIG. 8, in some embodiments, the gate 830 is configured to detect comparison hits from the pattern matcher circuit 820. In embodiments, the summer 835 determines the difference between the matching hits and the error threshold level (eth) to determine a symbol error magnitude. In these embodiments, the accumulator circuit 840 accumulates the error amplitude for different slicer levels. In embodiments, the divider circuit 850 divides the accumulated error amplitude to generate a sign and magnitude of error, e.g., resulting in a vector of errors for each sequence pattern that is being analyzed. In embodiments, the analysis might be done for the same pattern a million symbols, for example, so the accumulation may be averaged to generate the resultant error levels, e.g., in order to distinguish the sequence dependent error from other noise sources affecting the error. Further, the feedback from the output of the accumulator circuit 840 may be compared to new values so there is continuous updating to find the trend of the accumulated values, enabling determination of the sign of the error accumulation.

Figure 9:
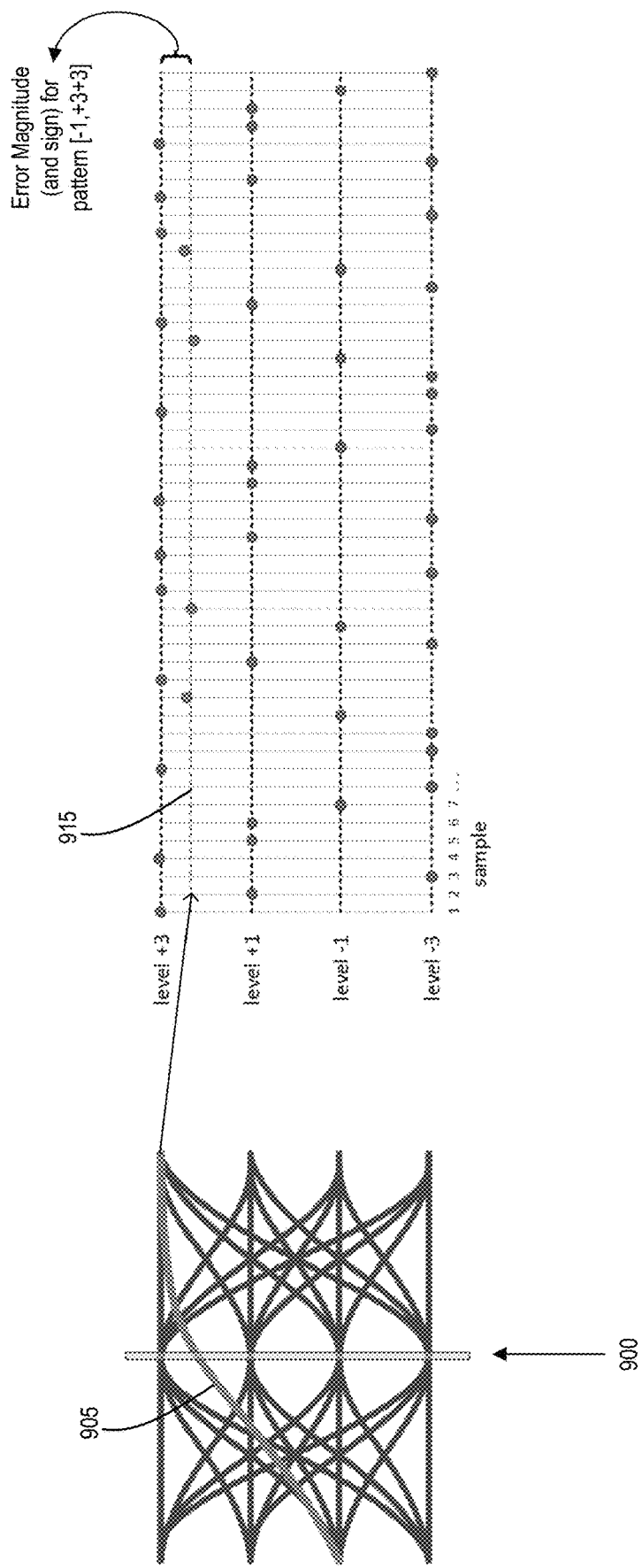
FIG. 9 is a graph illustrative, as an example, of an error magnitude and sign for a slice through a PAM4 signal, in accordance with at least some embodiments.

FIG. 9 is a graph illustrative, as an example, of an error magnitude and sign for a slice through a PAM4 signal 900, in accordance with at least some embodiments. In exemplary embodiments, the slicer circuit 810 slices the PAM4 signal 900 at particular symbol levels, e.g., illustrated as a slice trajectory 905 through the PAM4 signal 900 at [−1,+3,+3]. In embodiments, the slice trajectory 905 can be traced to determine a sequence of amplitude and sign values (e.g., sampled values from the slicing) within a PAM4 graph.

In embodiments, the control logic detects at all the occurrences at different sampled locations and determine an average level of the sampled occurrences, detecting error magnitude and sign. As illustrated, a line 915 can be located within the PAM4 levels from which an error magnitude and sign can be determined. In the example of FIG. 9, the error magnitude is just below 9 (so negative sign) the +3 PAM4 level.

Figure 10:
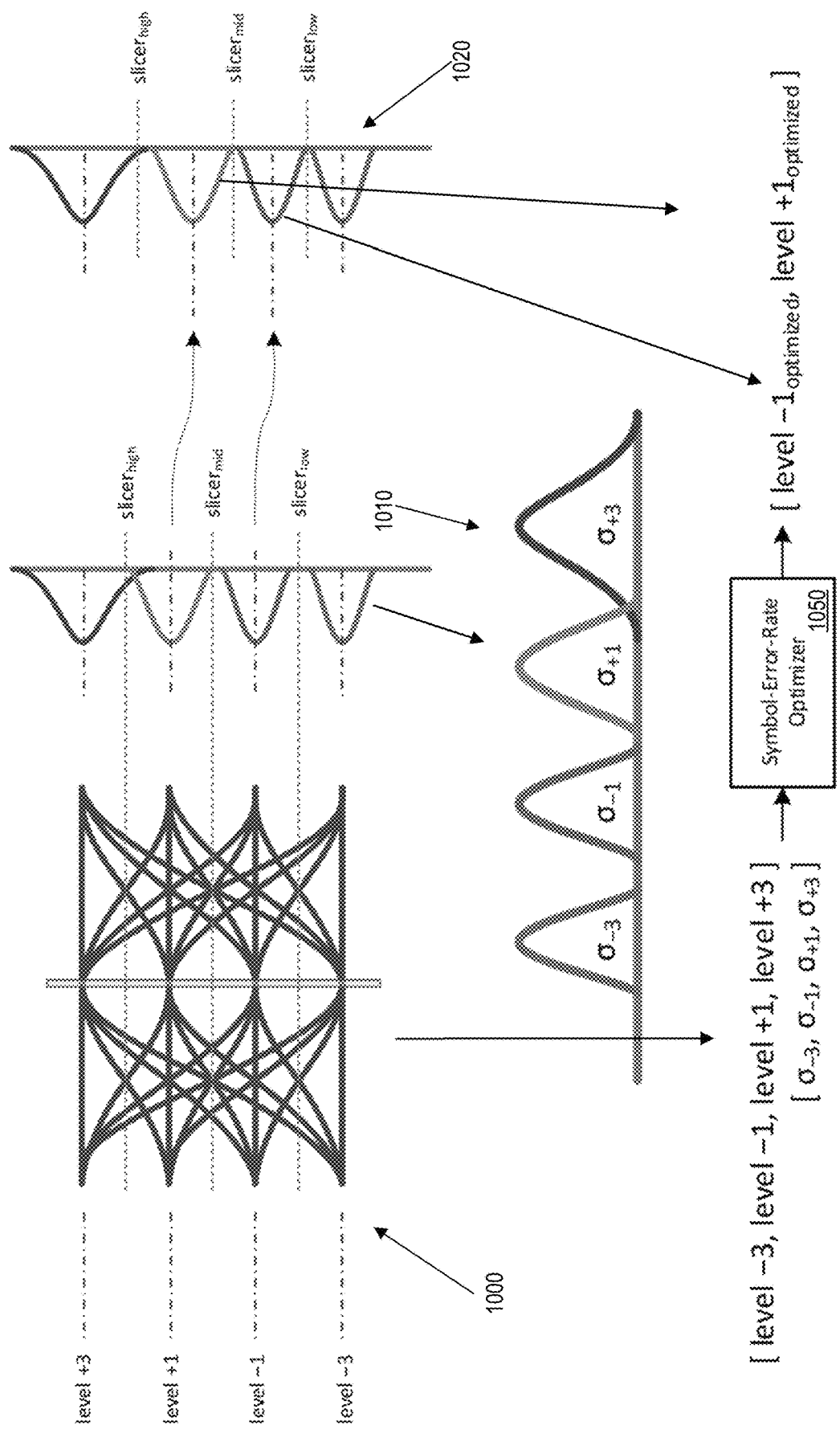
FIG. 10 is a set of graphs illustrating results of a symbol error rate optimizer configured in accordance with at least some embodiments.

FIG. 10 is a set of graphs illustrating results of a symbol error rate optimizer configured in accordance with at least some embodiments. In some embodiments, by way of example, a PAM4 graph is illustrated that includes four PAM levels, e.g., −3, −1, +1, +3. Presume the slicer circuit 810 slices through a PAM4 level signal at three different levels, high, middle, and low, as illustrated in graph 1010. The eye diagram may be sampled in locations generally around maximum eye height areas to form histogram distributions, e.g., at three different levels, slicer-high, slicer-mid, and slicer-low of the PAM4 signal, as illustrated in graph 1010.

It can be observed in graph 1010 that histogram of level −3 (or $\sigma_{-3}$) has a sizeable gap from the histogram of level −1 (or $\sigma_{-1}$), that histogram of level −1 is at a normal gap with the histogram of level +1 (or $\sigma_{+1}$), but that the histogram of level +1 has a tail that overlaps with a tail of the histogram of level +3 (or $\sigma_{+3}$). To improve error rates in receiving this PAM4 signal, the control logic can adjust to minimize this overlap of adjacent distributions of the sampled PAM4 levels. For example, in some embodiments, the control logic includes a symbol error rate optimizer 1050 configured to detect how much the tail of each distribution overlaps that of an adjacent distribution and moves these PAM4 signal levels up/down with LUT value adjustments and tuning. In the illustrated embodiment of FIG. 10, the control logic strives to keep the outer two levels fixed (have less variability possible with them) and so just adjusts the inner two levels (level −1 and level +1) to make the PAM4 levels more equidistant from each other. This is because the outer PAM4 levels (levels +3 and +3) are generally fixed by gains and DAC operation in the transmitter.

In these embodiments, the control logic can also affect the shape of these histogram distributions. In embodiments, the control logic provides the symbol error rate optimizer 1050 with standard deviations and the PAM4 levels. In embodiments, in response, the symbol error rate optimizer 1050 redistributes, in this case, the two inner levels to a better location where there is less of these tails overlapping with the slicer circuit 810, which can be observed in graph 1020 after the redistribution of these PAM4 levels. Considering a slice of thresholds, if there overlapping tails from the distributions are minimized, results in a better symbol error rate.

Accordingly, in these embodiments, the symbol error rate optimizer 1050 uses these standard deviations and slicer positions to calculate a better position. For example, the symbol error rate optimizer 1050 can calculate how far the level −1 distribution can be shifted down (negative direction) in graph 1010 in order to make room for the level +1 distribution to also be shifted down, leaving more room for the tail of the level +3 distribution and minimizes the distribution overlap of the level +1 and level +3 distributions and, overall, better equalizing the gaps between the respective distributions. In embodiments, these modifications of the LUT values to adjust these gaps results in fewer errors (lower bit error rate) in the received PAM4 signal.

Figure 11:
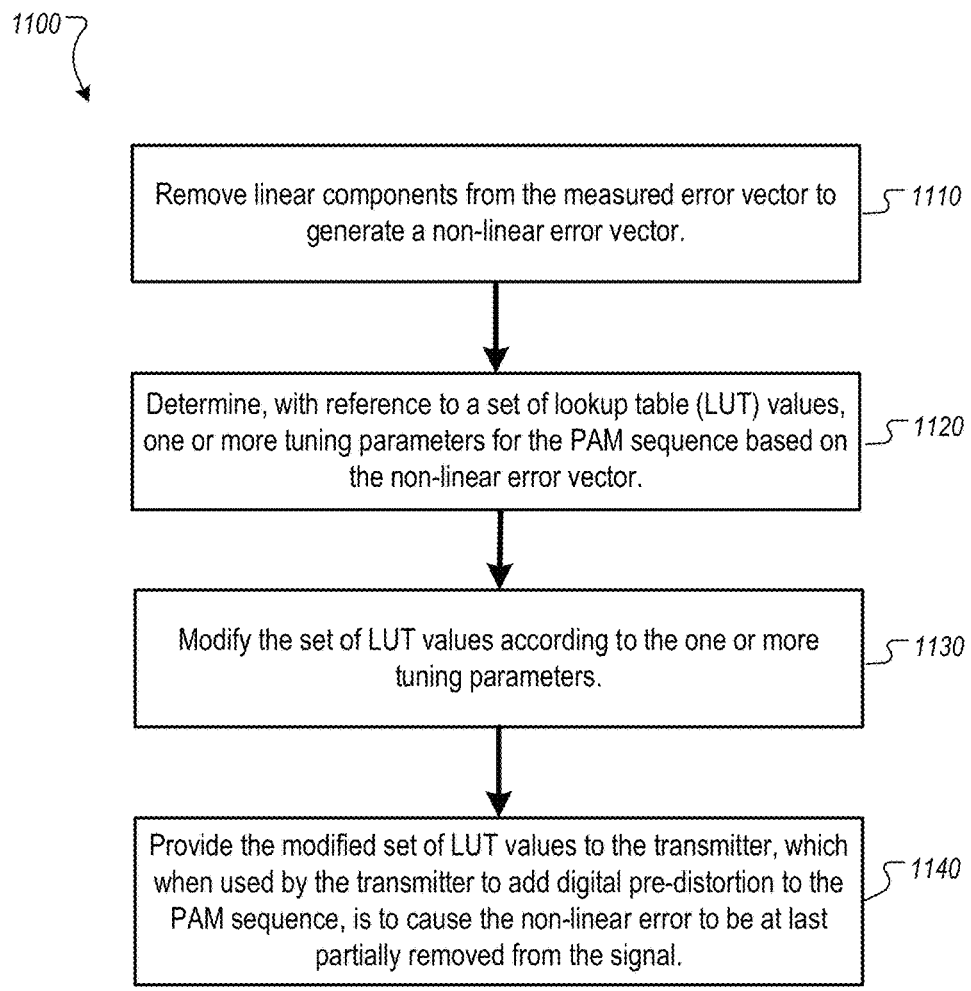
FIG. 11 is a flow diagram of a method for tuning digital pre-distortion for a transmitter to correct for non-linear error in a receiver, in accordance with some embodiments.

FIG. 11 is a flow diagram of a method 1100 for tuning digital pre-distortion for a transmitter to correct for non-linear error in a receiver, in accordance with some embodiments. The method 1100 can be performed by processing logic comprising hardware, software, firmware, or any combination thereof. In various embodiments, the method 1100 is performed by a receiver device 110, 220, 610 or a combination of the receiver device and the LUT update calculator 119 or 619. In embodiments, the method 1100 starts after already having measured (or determined) an error vector of a PAM sequence in a signal received from a transmitter.

At operation 1110, the processing logic removes estimated linear components from the measured error vector to generate a non-linear error vector.

At operation 1120, the processing logic determines, with reference to a set of lookup table (LUT) values, one or more tuning parameters for the PAM sequence based on the non-linear error vector.

At operation 1130, the processing logic modifies the set of LUT values according to the one or more tuning parameters.

At operation 1140, the processing logic provides the modified set of LUT values to the transmitter, which when used by the transmitter to add digital pre-distortion to the PAM sequence, is to cause the non-linear error to be at least partially removed from the signal.

Figure 12:
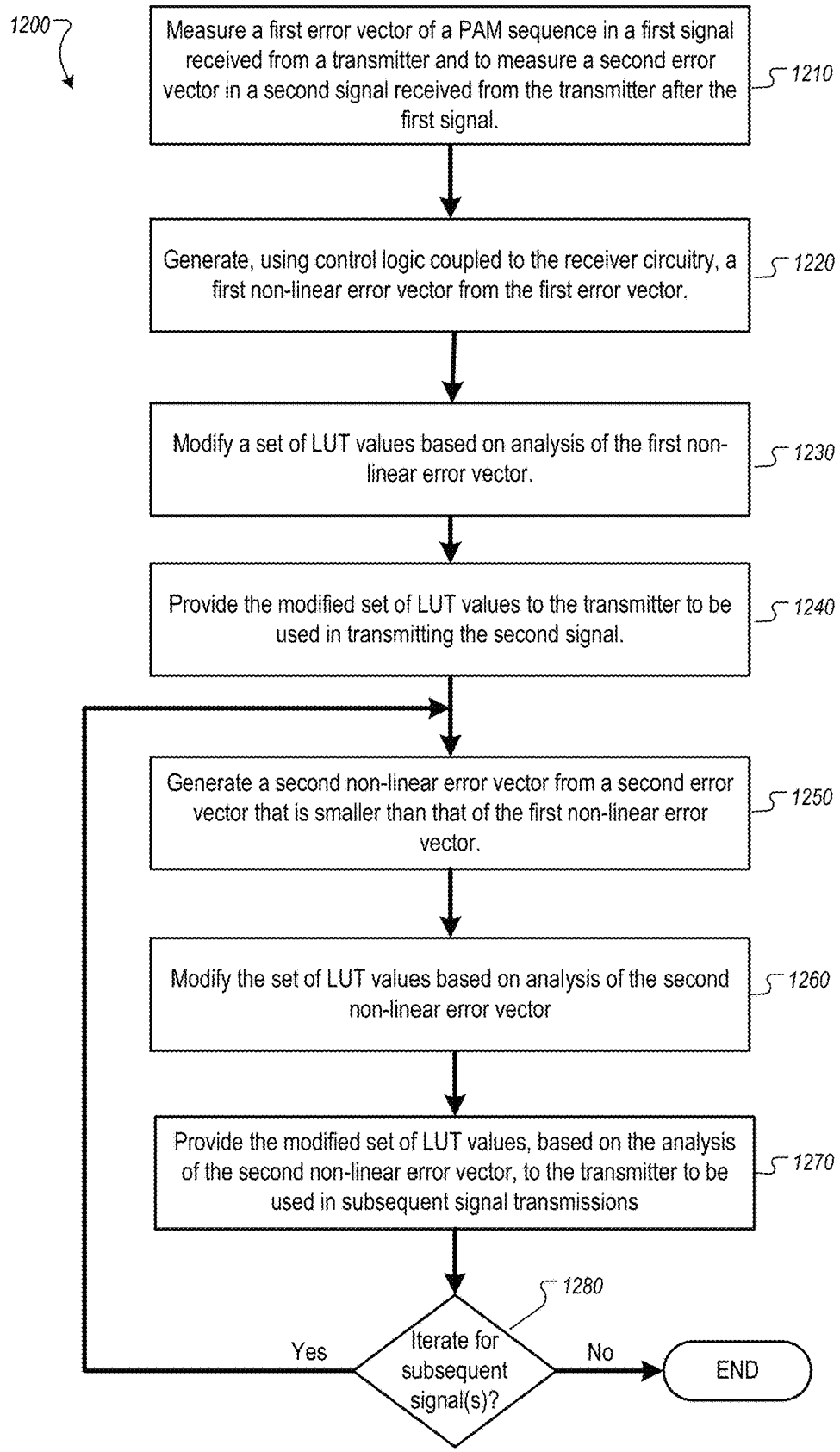
FIG. 12 is a flow diagram of an example method for tuning digital pre-distortion may be performed for a transmitter to correct for non-linear error in a receiver, in accordance with at least some embodiments.

FIG. 12 is a flow diagram of an example method 1200 for tuning digital pre-distortion may be performed for a transmitter to correct for non-linear error in a receiver, in accordance with at least some embodiments. The method 1200 can be performed by processing logic comprising hardware, software, firmware, or any combination thereof. In various embodiments, the method 1200 is performed by a receiver device 110, 220, 610 or a combination of the receiver device and the LUT update calculator 119 or 619. With reference to method 1200 of FIG. 12, additional or alternative operations may be performed as has been discussed herein with reference to the embodiments of FIGS. 1-11. The method 1200 may include a level of iterating on the operations discussed with reference to FIG. 7 and FIG. 11.

At operation 1210, the processing logic measures, using receiver circuitry, a first error vector of a pulse amplitude modulation (PAM) sequence in a first signal received from a transmitter and measures a second error vector in a second signal received from the transmitter after the first signal. In some embodiments, the first signal includes a multi-PAM symbol signal, and, to measure the first error vector, the processing logic samples the first signal across multiple PAM symbol levels associated with the PAM sequence. The processing logic may then determine, from each sampled signal, a magnitude and sign of each of a plurality of symbols that match the PAM sequence. The processing logic may then accumulate the magnitude and sign of the plurality of symbols for multiple samples and divide the accumulated magnitude and sign by a number of the multiple samples to determine the first error vector.

At operation 1220, the processing logic generate a first non-linear error vector from the first error vector. In some embodiments, to generate the first non-linear error vector, the processing logic removes linear components from the first error vector, including identifying, from the first signal that is output from a feedforward equalizer (FFE) of the receiver circuitry, a residual linear inter-symbol interference (ISI) represented as a linear function of symbol sequences. The processing logic can then remove the residual ISI from the first error vector.

At operation 1230, the processing logic modifies a set of LUT values based on analysis of the first non-linear error vector. In some embodiments, the processing logic determines, with reference to the set of LUT values, variations to a plurality of adapted error threshold levels that approximate the first non-linear error vector. To modify the set of LUT values, the processing logic can then remove the variations from the set of LUT values. In some embodiments, to determine the variations, the processing logic characterizes, with a Jacobian matrix, measured error values of the first non-linear error vector that correspond to respective values of the set of LUT values and multiplies a pseudo-inverse of the Jacobian matrix with the first non-linear error vector.

In at least some embodiments, the processing logic determines, with reference to the set of LUT values, a plurality of target error threshold levels for the PAM sequence. Further, to modify the set of LUT values, the processing logic further tunes at least some of the set of LUT values according to the plurality of target error threshold levels.

At operation 1240, the processing logic provides the modified set of LUT values to the transmitter to be used in transmitting the second signal.

At operation 1250, the processing logic generates a second non-linear error vector from the second error vector that is smaller than that of the first non-linear error vector. The second non-linear error vector may be smaller, for example, due to reducing the non-linear error compared to the first non-linear error vector during a first iteration through the method 700 of FIG. 7.

At operation 1260, the processing logic modifies the set of LUT values based on analysis of the second non-linear error vector.

At operation 1270, the processing logic provides the modified set of LUT values, based on the analysis of the second non-linear error vector, to the transmitter to be used in subsequent signal transmissions.

At operation 1280, the processing logic determines whether to iterate on the LUT modification algorithm for subsequent signals, e.g., whether due to a user-requested number of iterations or due to obtaining a pre-determined error threshold. Such an error threshold may be defined as a percentage of a total error threshold or a target error threshold, for example. If further iterations are detected, the processing logic continues back to operation 1250. Otherwise, the method 1200 ends at least for that particular PAM sequence.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or parallel. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A receiver device comprising:
   circuitry to measure an error vector of a pulse amplitude modulation (PAM) sequence in a signal received from a transmitter; and
   control logic coupled to the circuitry, the control logic to:

remove estimated linear components from the measured error vector to generate a non-linear error vector;

determine, with reference to a set of lookup table (LUT) values, one or more tuning parameters for the PAM sequence based on the non-linear error vector;

modify the set of LUT values according to the one or more tuning parameters; and provide the modified set of LUT values to the transmitter, which when used by the transmitter to add digital pre-distortion to the PAM sequence, is to cause the non-linear error to be at least partially removed from the signal.

2. The receiver device of claim 1, further comprising memory coupled to the control logic, the memory to store a data structure encoded with the set of LUT values.

3. The receiver device of claim 1, wherein, to remove the estimated linear components from the measured error vector, the control logic is to:

identify, from the signal that is output from a feedforward equalizer (FFE) of the circuitry, a residual linear inter-symbol interference (ISI) represented as a linear function of symbol sequences; and remove the residual ISI from the measured error vector.

4. The receiver device of claim 1, wherein the signal comprises a multi-PAM symbol signal, and wherein, to measure the error vector, the circuitry is to:

sample the signal across multiple PAM symbol levels associated with the PAM sequence;

determine, from each sampled signal, magnitude and sign of each of a plurality of symbols that match the PAM sequence;

accumulate the magnitude and sign of the plurality of symbols for multiple samples; and divide the accumulated magnitude and sign by a number of the multiple samples to determine the measured error vector.

5. The receiver device of claim 1, wherein, to determine the one or more tuning parameters, the control logic is to determine, with reference to a set of LUT values, variations to a plurality of adapted error threshold levels that approximate the non-linear error vector; and to modify the set of LUT values, the control logic is to remove the variations from the set of LUT values.

6. The receiver device of claim 5, wherein to determine the variations, the control logic is to:

characterize, with a Jacobian matrix, measured error values of the non-linear error vector that correspond to respective values of the set of LUT values; and multiply a pseudo-inverse of the Jacobian matrix with the non-linear error vector.

7. The receiver device of claim 1, wherein to determine the one or more tuning parameters, the control logic is to determine, with reference to the set of LUT values, a plurality of target error threshold levels for the PAM sequence; and to modify the set of LUT values, the control logic is to tune at least some of the set of LUT values according to the plurality of target error threshold levels.

8. The receiver device of claim 7, wherein, to determine the plurality of target error threshold levels, the control logic is to one of:

identify a plurality of adapted error threshold levels;

evenly distribute the plurality of adapted error threshold levels of respective symbols of the PAM sequence; or optimize the plurality of adapted error threshold levels such that tails of amplitude distributions of the respective symbols have a minimum overlap.

9. The receiver device of claim 1, wherein the control logic is further to offset, scale, and quantize the modified set of LUT values to fit a digital-to-analog converter (DAC) through which the set of LUT values is transferred within the transmitter.

10. A system comprising:

receiver circuitry to measure a first error vector of a pulse amplitude modulation (PAM) sequence in a first signal received from a transmitter and to measure a second error vector in a second signal received from the transmitter after the first signal; and control logic coupled to the receiver circuitry, the control logic to:

generate a first non-linear error vector from the first error vector;

modify a set of LUT values based on analysis of the first non-linear error vector;

provide the modified set of LUT values to the transmitter to be used in transmitting the second signal;

generate a second non-linear error vector from the second error vector that is smaller than that of the first non-linear error vector;

modify the set of LUT values based on analysis of the second non-linear error vector; and provide the modified set of LUT values, based on the analysis of the second non-linear error vector, to the transmitter to be used in subsequent signal transmissions.

11. The system of claim 10, wherein the control logic is instantiated as a LUT-update calculator coupled between a receiver device comprising the receiver circuitry and a transmitter device comprising the transmitter.

12. The system of claim 10, wherein, to generate the first non-linear error vector, the control logic is to remove estimated linear components from the first error vector, comprising:

identify, from the first signal that is output from a feed-forward equalizer (FFE) of the receiver circuitry, a residual linear inter-symbol interference (ISI) represented as a linear function of symbol sequences; and remove the residual ISI from the first error vector.

13. The system of claim 10, wherein the first signal comprises a multi-PAM symbol signal, and wherein, to measure the first error vector, the circuitry is to:

sample the first signal across multiple PAM symbol levels associated with the PAM sequence;

determine, from each sampled signal, magnitude and sign of each of a plurality of symbols that match the PAM sequence;

accumulate the magnitude and sign of the plurality of symbols for multiple samples; and divide the accumulated magnitude and sign by a number of the multiple samples to determine the first error vector.

14. The system of claim 10, wherein the control logic is further to determine, with reference to the set of LUT values, variations to a plurality of adapted error threshold levels that approximate the first non-linear error vector, and wherein, to modify the set of LUT values, the control logic is to remove the variations from the set of LUT values.

15. The system of claim 14, wherein to determine the variations, the control logic is to:

characterize, with a Jacobian matrix, measured error values of the first non-linear error vector that correspond to respective values of the set of LUT values; and multiply a pseudo-inverse of the Jacobian matrix with the first non-linear error vector.

16. The system of claim 10, wherein the control logic is further to determine, with reference to the set of LUT values, a plurality of target error threshold levels for the PAM sequence, and wherein, to modify the set of LUT values, the control logic is further to tune at least some of the set of LUT values according to the plurality of target error threshold levels.

17. The system of claim 16, wherein, to determine the plurality of target error threshold levels, the control logic is to one of:
 identify a plurality of adapted error threshold levels;
 evenly distribute the plurality of adapted error threshold levels of respective symbols of the PAM sequence; or
 optimize the plurality of adapted error threshold levels such that tails of amplitude distributions of the respective symbols have a minimum overlap.

18. The system of claim 10, wherein the control logic is further to offset, scale, and quantize the modified set of LUT values to fit a digital-to-analog converter (DAC) through which the set of LUT values is transferred within the transmitter.

19. A method comprising:
 measuring, using receiver circuitry, a first error vector of a pulse amplitude modulation (PAM) sequence in a first signal received from a transmitter and to measure a second error vector in a second signal received from the transmitter after the first signal;
 generating, using control logic coupled to the receiver circuitry, a first non-linear error vector from the first error vector;
 modifying a set of LUT values based on analysis of the first non-linear error vector;
 providing the modified set of LUT values to the transmitter to be used in transmitting the second signal;
 generating a second non-linear error vector from the second error vector that is smaller than that of the first non-linear error vector;
 modifying, by the control logic, the set of LUT values based on analysis of the second non-linear error vector; and
 providing, by the control logic, the modified set of LUT values, based on the analysis of the second non-linear error vector, to the transmitter to be used in subsequent signal transmissions.

20. The method of claim 19, wherein generating the first non-linear error vector comprises:
 identifying, from the first signal that is output from a feedforward equalizer (FFE) of the receiver circuitry, a residual linear inter-symbol interference (ISI) represented as a linear function of symbol sequences; and
 removing the residual ISI from the first error vector.

* * * * *